United States Patent
Yang et al.

(10) Patent No.: US 8,053,216 B2
(45) Date of Patent: Nov. 8, 2011

(54) BACTERIAL CELLULOSE-CONTAINING FORMULATIONS

(75) Inventors: Zhi-Fa Yang, San Diego, CA (US); Neil A. Morrison, San Diego, CA (US); Todd A. Talashek, San Diego, CA (US); David F. Brinkmann, San Diego, CA (US); Don DiMasi, San Diego, CA (US); You Lung Chen, Marietta, GA (US)

(73) Assignee: CP Kelco U.S., Inc., Atlanta, GA (US)

( * ) Notice: Subject to any disclaimer, the term of this patent is extended or adjusted under 35 U.S.C. 154(b) by 313 days.

(21) Appl. No.: 11/135,077

(22) Filed: May 23, 2005

(65) Prior Publication Data

US 2007/0197779 A1   Aug. 23, 2007

(51) Int. Cl.
*C12P 19/04*   (2006.01)

(52) U.S. Cl. ............ 435/101; 435/104; 435/179; 536/2; 536/3; 536/52; 536/56; 536/84; 106/162.9; 106/205.01

(58) Field of Classification Search .................. None
See application file for complete search history.

(56) References Cited

U.S. PATENT DOCUMENTS

| | | | |
|---|---|---|---|
| 5,144,021 A * | 9/1992 | Arie et al. ................ 536/56 |
| 5,620,706 A * | 4/1997 | Dumitriu et al. ............... 424/485 |
| 5,951,910 A * | 9/1999 | Skaggs et al. .................. 252/70 |
| 6,017,740 A * | 1/2000 | Kouda et al. .................. 435/101 |
| 6,069,136 A * | 5/2000 | Tahara et al. .................. 514/57 |
| 6,359,040 B1 | 3/2002 | Burdick |
| 6,495,190 B1 * | 12/2002 | Yaginuma et al. ............. 426/615 |
| 2007/0027108 A1 * | 2/2007 | Yang et al. ..................... 514/57 |

FOREIGN PATENT DOCUMENTS

WO   WO 97/48402        12/1997
WO   WO 01/05838 A1 *   1/2001

OTHER PUBLICATIONS

Plank, J., Appl. Microbiol Biotechnol, 2004, vol. 66, p. 1-9.*
Mei et al., Journal of Food Science, 2002, vol. 67, No. 5, p. 1964-1968.*
Merriam-Webster Online Dictionary definition of precipitation.*
Omoto et al., Handbook of Hydrocolloids Woodhead Publishing, 2001, Chapter 18, Bacterial cellulose, p. 321-330.*
Giuliano Copetti, et al., Synergistic gelation of xanthan gum with locust bean gum: a rheological investigation, Journal (1997) 14: 951-961, Chapman & Hall, Italy.
Johann Plank, Applications of biopolymers and other biotechnological products in building materials, Mini-Review (2004) 66: 1-9, Springer-Verlag, Germany.
Schroter K., et al., "Xanthomonas campestris pv. campestris secretes the endogkicanases ENGXCA and ENGXCB: construction of an endoglucanase-deficient mutant for industrial xanthan production, "Appl Microbiol Biotechnol (2001), pp. 727-733., (vol. 55), Springer-Verlag, Germany.
Omoto, T., et al., "Bacterial Celulose", *Handbook of Hydrocolloids*, 2000, p. 321-330.

\* cited by examiner

*Primary Examiner* — Kade Ariani
(74) *Attorney, Agent, or Firm* — Sutherland Asbill & Brennan LLP

(57) ABSTRACT

A new method to produce formulations of bacterial cellulose that exhibit improved viscosity-modifying properties particularly with low energy applied to effectuate viscosity changes therewith is provided. Such a method includes the novel co-precipitation with a water soluble co-agent that permits precipitation in the presence of excess alcohol to form an insoluble fiber that can than be utilized as a thickener or suspension aid without the need to introduce high energy mixing. Such bacterial cellulose properties have been available in the past but only through highly labor and energy intensive processes. Such an inventive method as now proposed thus provides a bacterial cellulose-containing formulation that exhibits not only properties that are as effective as those for previous bacterial celluloses, but, in some ways, improvements to such previous types. Certain end-use compositions and applications including these novel bacterial cellulose-containing formulations are also encompassed within this invention.

22 Claims, No Drawings

BACTERIAL CELLULOSE-CONTAINING FORMULATIONS

FIELD OF THE INVENTION

The present invention relates generally to a new method to produce formulations of bacterial cellulose that exhibit improved viscosity-modifying properties particularly with low energy applied to effectuate viscosity changes therewith. Such a method includes the novel co-precipitation with a water soluble co-agent that permits precipitation in the presence of excess alcohol to form an insoluble fiber that can than be utilized as a thickener or suspension aid without the need to introduce high energy mixing. Such bacterial cellulose properties have been available in the past but only through highly labor and energy intensive processes. Such an inventive method as now proposed thus provides a bacterial cellulose-containing formulation that exhibits not only properties as effective as those for previous bacterial celluloses, but, in some ways, improvements to such previous types. Certain end-use compositions and applications including these novel bacterial cellulose-containing formulations are also encompassed within this invention.

BACKGROUND OF THE INVENTION

Bacterial cellulose is a broad category of polysaccharides that exhibit highly desirable properties, even though such compounds are essentially of the same chemical structure as celluloses derived from plant material. As the name purports, however, the source of these polysaccharides are bacterial in nature (produced generally by microorganisms of the *Acetobacter* genus) as the result of fermentation, purification, and recovery thereof. Such bacterial cellulose compounds are comprised of very fine cellulosic fibers having very unique dimensions and aspect ratios (diameters of from about 40 to 100 nm each and lengths of from 0.1 to 15 microns) in bundle form (with a diameter of 0.1 to 0.2 microns on average). Such an entangled bundle structure forms a reticulated network structure that facilitates swelling when in aqueous solution thereby providing excellent three-dimensional networks. The three-dimensional structures effectuate proper and desirable viscosity modification as well as suspension capabilities through building a yield-stress system within a target liquid as well as excellent bulk viscosity. Such a result thus permits highly effective suspension of materials (such as foodstuffs, as one example) that have a propensity to settle over time out of solution, particularly aqueous solutions. Additionally, such bacterial cellulose formulations aid in preventing settling and separation of quick-preparation liquid foodstuffs (i.e., soups, chocolate drinks, yogurt, juices, dairy, cocoas, and the like), albeit with the need to expend relatively high amounts of energy through mixing or heating to initially reach the desired level of suspension for such foodstuffs.

The resultant fibers (and thus bundles) are insoluble in water and, with the capabilities noted above, exhibit polyol- and water-thickening properties. One particular type of bacterial cellulose, microfibrillated cellulose, is normally provided in an uncharged state and exhibits the ability to associate without any added influences. However, without any such extra additives to effectuate thickening or other type of viscosity modification, it has been realized that the resultant systems will themselves exhibit high degrees of instability, particularly over time periods associated with typical shelf life requirements of foodstuffs. As a result, certain co-agents, like carboxymethylcellulose (CMC), also known as cellulose gum, have been introduced to bacterial cellulose products through adsorption to the fibers thereof, following by spray drying (without any co-precipitation steps) in order to provide stabilization and dispersion improvements, most likely through the presence of negative charges on the CMC transferred to the bacterial cellulose fibers themselves. Such charges thus appear to provide repulsion capabilities to prevent the fiber bundles from relaxing the network formed. Even with such a possibility, the selection of a proper CMC has been known to greatly affect the resultant rheological properties of the target bacterial cellulose due to the salt and acid sensitivities of certain CMC products. As such, although improvements in bacterial cellulose utilization have been provided with such CMC inclusions in the past, great care must be taken to ensure the proper level of pH and salt conditions are suitable for the overall formulation. For this reason, further improvements to permit more reliability of bacterial cellulose use in myriad applications are of great interest to the target industries.

Additionally, although such bacterial celluloses are of great interest and importance in providing effective rheological modifications within liquid-based foodstuffs, for the reasons mentioned above, the costs associated with producing such cellulosic materials has proven very high, particularly in terms of necessary labor and waste issues resulting therefrom. Fermentation of such materials initially yields very low amounts. Generally, the production method of purifying and recovering such bacterial cellulose materials entails a cumbersome series of steps after fermentation is complete in order to produce a wet cake with a sufficient amount of bacterial cellulose product in terms of efficiency from initial fermentation. Further spray drying may also affect the final recovery yield of the bacterial cellulose during powder production.

Such excessive steps are not only labor and energy intensive but also result in large amounts of waste water and waste materials that require disposal and handling. As such, the costs for production of bacterial cellulose (in particular microfibrillated cellulose) have proven excessively high relative to other gums, thus restricting the utilization of such a product within certain desirable end-uses. To date, there has been no effective method developed that has remedied these problems, not to mention a method that ultimately provides a bacterial cellulose material that exhibits certain improved properties within target applications as compared with the materials produced through the aforementioned traditional production method.

Brief Description Of The Invention

Accordingly, this invention encompasses a method for the production of a bacterial cellulose-containing formulation comprising the steps of a) providing a bacterial cellulose product through fermentation; b) optionally lysing the bacterial cells from the resultant bacterial cellulose product; c) mixing said resulting bacterial cellulose of either step "a" or "b" product with a polymeric thickener selected from the group consisting of at least one charged cellulose ether, at least one precipitation agent, and any combination thereof; and d) co-precipitating the mixture of step "c" with a water-miscible nonaqueous liquid (such as, as one non-limiting example, an alcohol). The possible charged cellulose ether of step "c" is a compound utilized to disperse and stabilize the reticulated network in the final end-use compositions to which such a bacterial cellulose-containing formulation is added. The charged compounds facilitate, as alluded to above, the ability to form the needed network of fibers through the repulsion of individual fibers. The possible precipitation agent of step "c" is a compound utilized to preserve the functionality of the reticulated bacterial cellulose fiber during drying and milling. Examples of such charged cellulose ethers include such cellulose-based compounds that exhibit either an overall positive or negative and include, without limitation, any sodium carboxymethylcellulose (CMC), cationic hydroxyethylcellulose, and the like. The precipitation (drying) agent is selected from the group of natural and/or synthetic products including, without limitation, xanthan products, pectin, alginates, gellan gum, welan gum, diutan gum, rhamsan gum, carrageenan, guar gum, agar, gum arabic, gum ghatti, karaya gum, gum tragacanth, tamarind gum, locust bean gum, and the like. Preferably, though not necessarily, for reasons associated with the ability to reactivate the bacterial cellulose after spray drying and prior to incorporation within a target liquid to be rheologically modified therewith, a precipitation (drying) agent is included. Thus, one more specific method encompassed within this invention comprises the steps of a) providing a bacterial cellulose product through fermentation; b) optionally lysing the bacterial cells from the bacterial cellulose product; c) mixing said resulting bacterial cellulose product of either step "a" or step "b" with a biogum (which if incorporated as a fermentation broth has had the bacterial cells preferably lysed there from); and d) co-precipitating the mixture of step "c" with a water-miscible nonaqueous liquid. Alternatively, such a specific method may comprise the steps of a) providing a bacterial cellulose product through fermentation; b) mixing said bacterial cellulose product with a biogum; c) co-lysing the mixture of step "b" to remove bacterial cells therefrom; and d) co-precipitating the mixture of step "c" with a water-miscible nonaqueous liquid. The resultant coprecipitated product will be in the form of a presscake that can then be dried and the particles obtained thereby may then be milled to a desired particle size. Furthermore, for certain applications, the particles may then be blended with another hydrocolloid, such as carboxymethylcellulose (CMC), to provide certain properties. Additionally, an inventive product of this development would be defined as a bacterial cellulose-containing formulation comprising at least one bacterial cellulose material and at least one polymeric thickener selected from the group consisting of at least one charged cellulose ether, at least precipitation agent selected from the group consisting of xanthan products, pectin, alginates, gellan gum, welan gum, diutan gum, rhamsan gum, carrageenan, guar gum, agar, gum arabic, gum ghatti, karaya gum, gum tragacanth, tamarind gum, locust bean gum, and the like, and any mixtures thereof, wherein said formulation exhibits a viscosity capability of at least 300 cps and a yield stress measurement of 1.0 dyne/cm$^2$ when introduced in an amount of at most 0.36% by weight of a 500 mL sample of water and after application of at most 2 passes at 1500 psi in an extensional homogenizer.

As one potentially preferred embodiment, the formulation of bacterial cellulose and xanthan produced thereby has the distinct advantage of facilitating activation without any labor- or energy-intensive activation required. Another distinct advantage of this overall method is the ability to collect the resultant bacterial cellulose-containing formulation through precipitation with isopropyl alcohol, whether with a charged cellulose ether or a precipitation (drying) agent present therein. Thus, since the bacterial cellulose is co-precipitated in the manner described above, the alcohol-insoluble polymeric thickener (such as xanthan or sodium CMC) appears, without intending on being bound to any specific scientific theory, to provide protection to the bacterial cellulose by providing a coating over at least a portion of the resultant formed fibers thereof. In such a way, it appears that the polymeric thickener actually helps associate and dewater the cellulosic fibers upon the addition of a nonaqueous liquid (such as preferably a lower alkyl alcohol), thus resulting in the collection of substantial amounts of the low-yield polysaccharide during such a co-precipitation stage. The avoidance of substantial amounts of water during the purification and recovery steps thus permits larger amounts of the bacterial cellulose to be collected ultimately. With this novel process, the highest amount of fermented bacterial cellulose can be collected, thus providing the high efficiency in production desired, as well as the avoidance of, as noted above, wastewater and multiple passes of dewatering and re-slurrying typically required to obtain such a resultant product. Furthermore, as noted previously, the presence of a drying agent, in particular, as one non-limiting example, a xanthan product, as a coating over at least a portion of the bacterial cellulose fiber bundles, appears to provide the improvement in activation requirements when introduced within a target end use composition. Surprisingly, there is a noticeable reduction in the energy necessary to effectuate the desired rheological modification benefits accorded by this inventive bacterial cellulose-containing formulation as compared with the previously practiced products of similar types. As well, since bacterial cellulose (i.e., microfibrillated cellulose, hereinafter referred to as "MFC") provides unique functionality and rheology as compared to a soluble polymeric thickener alone, the resultant product made via this inventive method permits a lower cost alternative to typical processes with improvements in reactivation requirements, resistance to viscosity changes during high temperature food processing, and improved suspension properties during long term shelf storage.

DETAILED DESCRIPTION OF THE INVENTION

For purposes of this invention, the term "bacterial cellulose-containing formulation" is intended to encompass a bacterial cellulose product as produced by the inventive method and thus including xanthan product coating at least of the portion of the resultant bacterial cellulose fiber bundles. The term "formulation" thus is intended to convey that the product made therefrom is a combination of bacterial cellulose and xanthan produced in such a manner and exhibiting such a resultant structure and configuration. The term "bacterial cellulose" is intended to encompass any type of cellulose produced via fermentation of a bacteria of the genus *Acetobacter* and includes materials referred popularly as microfibrillated cellulose, reticulated bacterial cellulose, and the like.

As noted above, bacterial cellulose may be used as an effective rheological modifier in various compositions. Such materials, when dispersed in fluids, produce highly viscous, thixotropic mixtures possessing high yield stress. Yield stress is a measure of the force required to initiate flow in a gel-like system. It is indicative of the suspension ability of a fluid, as well as indicative of the ability of the fluid to remain in situ after application to a vertical surface.

Typically, such rheological modification behavior is provided through some degree of processing of a mixture of the bacterial cellulose in a hydrophilic solvent, such as water, polyols (e.g., ethylene glycol, glycerin, polyethylene glycol, etc.), or mixtures thereof. This processing is called "activation" and comprises, generally, high pressure homogenization and/or high shear mixing. The inventive bacterial cellulose-containing formulations of the invention, however, have been found to activate at low energy mixing. Activation is a process in which the 3-dimensional structure of the cellulose is modified such that the cellulose imparts functionality to the base solvent or solvent mixture in which the activation occurs, or to a composition to which the activated cellulose is added. Functionality includes providing such properties as thickening, imparting yield stress, heat stability, suspension properties, freeze-thaw stability, flow control, foam stabilization, coating and film formation, and the like. The processing that is followed during the activation process does significantly more than to just disperse the cellulose in base solvent. Such processing "teases apart" the cellulose fibers to expand the cellulose fibers. The bacterial cellulose-containing formulation may be used in the form of a wet slurry (dispersion) or as a dried product, produced by drying the dispersion using well-known drying techniques, such as spray-drying or freeze-drying to impart the desired rheological benefits to a target fluid composition. The activation of the bacterial cellulose (such as MFC or reticulated bacterial cellulose) expands the cellulose portion to create a reticulated network of highly intermeshed fibers with a very high surface area. The activated reticulated bacterial cellulose possesses an extremely high surface area that is thought to be at least 200-fold higher than conventional microcrystalline cellulose (i.e., cellulose provided by plant sources).

The bacterial cellulose utilized herein may be of any type associated with the fermentation product of *Acetobacter* genus microorganisms, and was previously available, as one example, from CPKelco U.S. under the tradename CELLULON®. Such aerobic cultured products are characterized by a highly reticulated, branching interconnected network of fibers that are insoluble in water.

The preparation of such bacterial cellulose products are well known. For example, U.S. Pat. Nos. 5,079,162 and 5,144,021, both of which are incorporated by reference herein, disclose a method and media for producing reticulated bacterial cellulose aerobically, under agitated culture conditions, using a bacterial strain of *Acetobacter aceti* var. *xylinum*. Use of agitated culture conditions results in sustained production, over an average of 70 hours, of at least 0.1 g/liter per hour of the desired cellulose. Wet cake reticulated cellulose, containing approximately 80-85% water, can be produced using the methods and conditions disclosed in the above-mentioned patents. Dry reticulated bacterial cellulose can be produced using drying techniques, such as spray-drying or freeze-drying, that are well known.

*Acetobacter* is characteristically a gram-negative, rod shaped bacterium 0.6-0.8 microns by 1.0-4 microns. It is a strictly aerobic organism; that is, metabolism is respiratory, not fermentative. This bacterium is further distinguished by the ability to produce multiple poly α-1,4-glucan chains, chemically identical to cellulose. The microcellulose chains, or microfibrils, of reticulated bacterial cellulose are synthesized at the bacterial surface, at sites external to the cell membrane. These microfibrils generally have cross sectional dimensions of about 1.6 nm by 5.8 nm. In contrast, under static or standing culture conditions, the microfibrils at the bacterial surface combine to form a fibril generally having cross sectional dimensions of about 3.2 nm by 133 nm. The small cross sectional size of these *Acetobacter*-produced fibrils, together with the concomitantly large surface and the inherent hydrophilicity of cellulose, provides a cellulose product having an unusually high capacity for absorbing aqueous solutions. Additives have often been used in combination with the reticulated bacterial cellulose to aid in the formation of stable, viscous dispersions.

The aforementioned problems inherent with purifying and collecting such bacterial cellulose have led to the determination that the method employed herein provides excellent results to the desired extent. The first step in the overall process is providing any amount of the target bacterial cellulose in fermented form. The production method for this step is described above. The yield for such a product has proven to be very difficult to generate at consistently high levels, thus it is imperative that retention of the target product be accomplished in order to ultimately provide a collected product at lowest cost.

Purification is well known for such materials. Lysing of the bacterial cells from the bacterial cellulose product is accomplished through the introduction of a caustic, such as sodium hydroxide, or any like high pH (above about 12.5 pH, preferably) additive in an amount to properly remove as many expired bacterial cells as possible from the cellulosic product. This may be followed in more than one step if desired. Neutralizing with an acid is then typically followed. Any suitable acid of sufficiently low pH and molarity to combat (and thus effectively neutralize or reduce the pH level of the product as close to 7.0 as possible) may be utilized. Sulfuric acid, hydrochloric, and nitric acid are all suitable examples for such a step. One of ordinary skill in the art would easily determine the proper selection and amount of such a reactant for such a purpose. Alternatively, the cells may be lysed and digested through enzymatic methods (treatment with lysozyme and protease at the appropriate pH).

The lysed product is then subjected to mixing with a polymeric thickener in order to effectively coat the target fibers and bundles of the bacterial cellulose. The polymeric thickener must be insoluble in alcohol (in particular, isopropyl alcohol). Such a thickener is either an aid for dispersion of the bacterial cellulose within a target fluid composition, or an aid in drying the bacterial cellulose to remove water therefrom more easily, as well as potentially aid in dispersing or suspending the fibers within a target fluid composition. Proper dispersing aids (agents) include, without limitation, CMC (of various types), cationic HEC, etc., in essence any compound that is polymeric in nature and exhibits the necessary dispersion capabilities for the bacterial cellulose fibers when introduced within a target liquid solution. Preferably such a dispersing aid is CMC, such as CEKOL® available from CP Kelco. Proper precipitation aids (agents), as noted above, include any number of biogums, including xanthan products (such as KELTROL®, KELTROL T®, and the like from CP Kelco), gellan gum, welan gum, diutan gum, rhamsan gum, guar, locust bean gum, and the like, and other types of natural polymeric thickeners, such as pectin, as one non-limiting example. Preferably, the polymeric thickener is a xanthan product and is introduced and mixed with the bacterial cellulose in a broth form. Basically, the commingling of the two products in broth, powder or rehydrated powder form, allows for the desired generation of a xanthan coating on at least a portion of the fibers and/or bundles of the bacterial cellulose. In one embodiment, the broths of bacterial cellulose and xanthan are mixed subsequent to purification (lysing) of both in order to remove the residual bacterial cells. In another embodiment, the broths may be mixed together without lysing initially, but co-lysed during mixing for such purification to occur.

The amounts of each component within the method may vary greatly. For example, the bacterial cellulose will typically be present in an amount from about 0.1% to about 5% by weight of the added polymeric thickener, preferably from about 0.5 to about 3.0%, whereas the polymeric thickener may be present in an amount form 10 to about 900% by weight of the bacterial cellulose.

After mixing and coating of the bacterial cellulose by the polymeric thickener, the resultant product is then collected through co-precipitation in a water-miscible nonaqueous liquid. Preferably, for toxicity, availability, and cost reasons, such a liquid is an alcohol, such as, as most preferred, isopropyl alcohol. Other types of alcohols, such as ethanol, methanol, butanol, and the like, may be utilized as well, not to mention other water-miscible nonaqeuous liquids, such as acetone, ethyl acetate, and the like. Any mixtures of such nonaqueous liquids may be utilized, too, for such a co-precipitation step. Generally, the co-precipitated product is processed through a solid-liquid separation apparatus, allowing for the alcohol-soluble components to be removed, leaving the desired bacterial cellulose-containing formulation thereon.

From there, a wetcake form product is collected and then transferred to a drying apparatus and subsequently milled for proper particle size production. Further co-agents may be added to the wetcake or to the dried materials in order to provide further properties and/or benefits Such co-agents include plant, algal and bacterial polysaccharides and their derivatives along with lower molecular weight carbohydrates such as sucrose, glucose, maltodextrin, and the like. Other additives that may be present within the bacterial cellulose-containing formulation include, without limitation, a hydrocolloid, polyacrylamides (and homologues), polyacrylic acids (and homologues), polyethylene glycol, poly(ethylene oxide), polyvinyl alcohol, polyvinylpyrrolidones, starch (and like sugar-based molecules), modified starch, animal-derived gelatin, and non-charged cellulose ethers (such as carboxymethylcellulose, hydroxyethylcellulose, and the like).

The bacterial cellulose-containing formulations of this invention may then be introduced into a plethora of possible food compositions, including, beverages, frozen products, cultured dairy, and the like; non-food compositions, such as household cleaners, fabric conditioners, hair conditioners, hair styling products, or as stabilizers or formulating agents for asphalt emulsions, pesticides, corrosion inhibitors in metal working, latex manufacture, as well as in paper and non-woven applications, biomedical applications, pharmaceutical excipients, and oil drilling fluids, etc. The fluid compositions including this inventive formulation, prepared as described above, may include such bacterial cellulose-containing formulations in an amount from about 0.01% to about 1% by weight, and preferably about 0.03% to about 0.5% by weight of the total weight of the fluid composition. The ultimately produced bacterial cellulose-containing formulation should impart a viscosity modification to water sample of 500 mL (when added in an amount of at most 0.36% by weight thereof) of at least 300 cps as well as a yield stress measurement within the same test sample of at least 1.0 dynes/cm$^2$.

PREFERRED EMBODIMENTS OF THE INVENTION

The following non-limiting examples provide teachings of various methods that are encompassed within this invention.

EXAMPLE 1

MFC was produced in a 1200 gal fermentor with final yield of 1.49 wt %. The broth was treated with 350 ppm of hypochlorite and subsequently treated with 70 ppm of lysozyme and 194 ppm of protease. A portion of the treated MFC broth was mixed with a given amount of xanthan gum broth (MFC/XG=2/1, dry basis) and the resultant mixture was then precipitated with isopropyl alcohol (85%) to form a press cake. A portion of the press cake was then dried in an oven at 70° C. for 2 hrs and milled in a Brinkmann Mill to 60 mesh. The powdered formulation was then introduced into a standard tap water (STW, 2.782 g of $CaCl_2.2H_2O$ and 18.927 g of NaCl are dissolved into 5 gal of de-ionized water) solution (500 mL) in an amount of about 0.36% by weight thereof, with 20% by weight of carboxymethylcellulose (CMC) added simultaneously (resulting in amounts of 0.288% of MFC/Xanthan and 0.072% of CMC), and the composition was then mixed with a Silverson mixer at 8000 rpm for 10 min. The product viscosity (measured via Brookfield viscometer, 61 Spindle at 5 rpm for 1 min) and yield stress was 1176 cP and 4.91 dynes/cm$^2$, respectively. Subsequently, 210 mL of the resultant activated MFC solution (0.36%) was then mixed with 15.5 grams of graded sand (through 60 mesh but on 80 mesh) to one beaker and mixed for 1 minute. To a separate beaker, another 210 mL sample of the resultant activated MFC solution was then also mixed with 15.5 grams of fine $CaCO_3$ and mixed for 1 minute. The contents of each beaker was then poured into separate 100 mL graduated cylinders and diluted to the 100 mL mark in each cylinder. In each case, the solutions exhibited excellent suspension properties and the solids (either sand or calcium carbonate) exhibited no precipitation from the target solution. The graduated cylinders were then each stored at room temperature (22-25° C.) for 24 hours to determine if precipitation occurred during that period of time. In each sample, after the 24 hours were completed, the phase separations for samples from either the top or the bottom were less than 10% (through visual estimation), thus indicating excellent long-term suspension properties.

EXAMPLE 2

MFC was produced in a 1200 gal fermentor with final yield of 1.49 wt %. The broth was treated with 350 ppm of hypochlorite and subsequently treated with 70 ppm of lysozyme and 194 ppm of protease. A portion of the treated MFC broth was mixed with a given amount of xanthan gum broth (MFC/XG=3/1, dry basis) under high shear and the resultant mixture was then precipitated with IPA (85%) to form a press cake. The press cake was dried and milled as in Example 1. The powdered formulation was then introduced into a STW sample in an amount of about 0.36% by weight thereof, with 20% by weight of CMC added simultaneously, and the composition was then mixed with a Silverson mixer at 8000 rpm for 10 min. The product viscosity and yield stress were 709 cP and 1.96 dynes/cm$^2$, respectively.

EXAMPLE 3

MFC was produced in a 1200 gal fermentor with final yield of 1.49 wt %. The broth was treated with 350 ppm of hypochlorite and subsequently treated with 70 ppm of lysozyme and 194 ppm of protease. A portion of the treated MFC broth was mixed with a given amount of xanthan gum broth (MFC/XG=4/1, dry basis) under high shear and the resultant mixture was then precipitated with IPA (85%) to form a press cake. The press cake was dried and milled as in Example 1. The powdered formulation was then introduced into a STW sample in an amount of about 0.36% by weight thereof, with 20% by weight of CMC added simultaneously, and the composition was then mixed with a Silverson mixer at 8000 rpm for 10 min. The product viscosity and yield stress were 635 cP and 1.54 dynes/cm$^2$, respectively.

EXAMPLE 4

MFC was produced in a 1200 gal fermentor with final yield of 1.49 wt %. The broth was treated with 350 ppm of hypochlorite and subsequently treated with 70 ppm of lysozyme and 194 ppm of protease. A portion of the treated MFC broth was mixed with a given amount of xanthan gum broth (MFC/XG=3/1, dry basis) and the resultant mixture was then precipitated with IPA (85%) to form a press cake. The press cake was then dried and milled as in Example 1. The powdered formulation was then introduced into a STW sample in an amount of about 0.36% by weight thereof, with 10% CMC added simultaneously, and the composition was then mixed with a Silverson mixer at 8000 rpm for 10 min. The product viscosity and yield stress were 1242 cP and 4.5 dynes/cm$^2$, respectively.

EXAMPLE 5

MFC was produced in a 1200 gal fermentor with final yield of 1.49 wt %. The broth was treated with 350 ppm of hypochlorite and subsequently treated with 70 ppm of lysozyme and 194 ppm of protease. A portion of the treated MFC broth was mixed with a given amount of xanthan gum broth (MFC/XG=3/1, dry basis) and the resultant mixture was then precipitated with IPA (85%) to form a press cake. The press cake was then dried and milled as in Example 1. The powdered formulation was then introduced into a STW sample in an amount of about 0.36% by weight thereof, with 20% of CMC added simultaneously, and the composition was then mixed with a Silverson mixer at 8000 rpm for 10 min. The product viscosity and yield stress were 1242 cP and 4.5 dynes/cm$^2$, respectively.

EXAMPLE 6

MFC was produced in a 1200 gal fermentor with final yield of 1.49 wt %. The broth was treated with 350 ppm of hypochlorite and subsequently treated with 70 ppm of lysozyme and 194 ppm of protease. A portion of the treated MFC broth was mixed with a given amount of xanthan gum broth (MFC/XG=3/1, dry basis) and the resultant mixture was then precipitated with IPA (85%) to form a press cake. The press cake was then dried and milled as in Example 1. The powdered formulation was then introduced into a STW sample in an amount of about 0.36% by weight thereof, with 20% by weight of CMC added simultaneously, and the composition was then activated with an extensional homogenizer at 1500 psi for 2 passes. The product viscosity and yield stress measurements were 1010 cP and 1.76 dynes/cm$^2$, respectively.

EXAMPLE 7

MFC was produced in a 1200 gal fermentor with final yield of 1.93 wt %. The broth was treated with 350 ppm of hypochlorite and subsequently treated with 70 ppm of lysozyme and 194 ppm of protease. A portion of the treated MFC broth was mixed with a given amount of xanthan gum broth (MFC/XG=3/1, dry basis) and the resultant mixture was then precipitated with IPA (85%) to form a press cake. The press cake was then dried and milled as in Example 1. The powdered formulation was then introduced into a STW sample in an amount of about 0.36% by weight thereof, with 20% CMC added simultaneously, and the composition was then mixed with a Silverson mixer at 8000 rpm for 5 min. The product viscosity and yield stress were 690 cP and 2.19 dynes/cm$^2$, respectively.

EXAMPLE 8

MFC was produced in a 1200 gal fermentor with final yield of 1.93 wt %. The broth was treated with 350 ppm of hypochlorite and subsequently treated with 70 ppm of lysozyme and 194 ppm of protease. A portion of the treated MFC broth was mixed with a given amount of xanthan gum broth and CMC solution (MFC/XG/CMC=3/1/1, dry basis) and the resultant mixture was then precipitated with IPA (85%) to form a press cake. The press cake was then dried and milled as in Example 1. The powdered formulation was then introduced into a STW sample in an amount of about 0.36% by weight thereof, and the composition was then mixed with a Silverson mixer at 8000 rpm for 5 min. The product viscosity and yield stress were 1057 cP and 3.65 dynes/cm$^2$, respectively.

EXAMPLE 9

MFC was produced in a 1200 gal fermentor with final yield of 1.93 wt %. The broth was treated with 350 ppm of hypochlorite and subsequently treated with 70 ppm of lysozyme and 194 ppm of protease. A portion of the treated MFC broth was mixed with a given amount of pectin solution (MFC/Pectin=6/1, dry basis) and the resultant mixture was then precipitated with IPA (85%) to form a press cake. The press cake was dried and milled as in Example 1. The powdered formulation was then introduced into a STW sample in an amount of about 0.36% by weight thereof, with 20% CMC added simultaneously, and the composition was then mixed with a Silverson mixer at 8000 rpm for 5 min. The product viscosity and yield stress were 377 cP and 1.06 dynes/cm$^2$, respectively.

EXAMPLE 10

MFC was produced in a 1200 gal fermentor with final yield of 1.93 wt %. The broth was treated with 350 ppm of hypochlorite and subsequently treated with 70 ppm of lysozyme and 194 ppm of protease. A portion of the treated MFC broth was mixed with a given amount of CMC solution (MFC/CMC=3/1, dry basis) and the resultant mixture was then precipitated with IPA (85%) to form a press cake. The press cake was dried and milled as in Example 1. The powdered formulation was then introduced into a STW sample in an amount of about 0.36% by weight thereof, and the composition was then mixed with a Silverson mixer at 8000 rpm for 5 min. The product viscosity and yield stress were 432 cP and 1.39 dynes/cm$^2$, respectively.

EXAMPLE 11

MFC was produced in a 1200 gal fermentor with final yield of 1.93 wt %. The broth was treated with 350 ppm of hypochlorite and subsequently treated with 70 ppm of lysozyme and 194 ppm of protease. A portion of the treated MFC broth was mixed with a given amount of pectin and CMC solutions (MFC/Pectin/CMC=6/1/2, dry basis) and the resultant mixture was then precipitated with IPA (85%) to form a press cake. The press cake was dried and milled as in Example 1. The powdered formulation was then introduced into a STW sample in an amount of about 0.36% by weight thereof, and the composition was then mixed with a Silverson mixer at 8000 rpm for 5 min. The product viscosity and yield stress were 552 cP and 1.74 dynes/cm$^2$, respectively.

EXAMPLE 12

MFC was produced in a 1200 gal fermentor with final yield of 1.51 wt %. The broth was treated with 350 ppm of hypochlorite and subsequently treated with 70 ppm of lysozyme and 350 ppm of protease followed with another 350 ppm of hypochlorite. A portion of the treated MFC broth was mixed with a given amount of xanthan gum broth (MFC/XG=2/1, dry basis), then precipitated with IPA (85%), and dried and milled as in Example 1. The powdered formulation was then introduced into a STW solution in an amount of about 0.2% by weight thereof, with 10% CMC added simultaneously, and the composition was then activated with an extensional homogenizer at 1500 psi for 2 passes. The product viscosity at 6 rpm was 377 cP.

EXAMPLE 13

MFC was produced in a 1200 gal fermentor with final yield of 1.6 wt %. The broth was treated with 350 ppm of hypochlorite and subsequently treated with 70 ppm of lysozyme and 350 ppm of protease followed with another 350 ppm of hypochlorite. A portion of the treated MFC broth was mixed with a given amount of xanthan gum broth (MFC/XG=2/1, dry basis), then precipitated with IPA (85%), and dried and milled as in Example 1. The powdered formulation was then introduced into a deionized water solution, a STW solution and 0.25% $CaCl_2$ solution, respectively, in an amount of about 0.2% by weight thereof, with 10% by weight of CMC added simultaneously, and the composition was then activated with an extensional homogenizer at 1500 psi for 2 passes. The product viscosities were 512 cP, 372 cP and 358 cP, in de-ionized water, STW and 0.25% $CaCl_2$ solution, respectively.

Analogous to the test performed in Example 1, with this sample about 20 3.2 mm diameter nylon beads (exhibiting a density each of about 1.14 g/mL) were dropped into each of the solutions (in de-ionized water, STW or 0.25% $CaCl_2$ solution) and the solutions were left at room temperature for 24 hours. None of the beads settled down to the bottom of the beakers after the time period expired, thus indicating excellent long-term suspension properties.

EXAMPLE 14

MFC was produced in a 1200 gal fermentor with final yield of 1.51 wt %. The broth was treated with 350 ppm of hypochlorite and subsequently treated with 70 ppm of lysozyme and 350 ppm of protease followed with another 350 ppm of hypochlorite. A portion of the treated MFC broth was mixed with a given amount of xanthan gum broth (MFC/XG=2/1, dry basis), then precipitated with IPA (85%), and dried and milled as in Example 1. The powdered formulation was then introduced into a deionized water sample in an amount of about 0.2% by weight thereof, with 10% by weight of CMC added simultaneously, and the composition was then activated with a propeller mixer at 2500 rpm for 10 min. The product viscosity was 185 cP.

EXAMPLE 15

MFC was produced in a 1200 gal fermentor with final yield of 1.4 wt %. The broth was treated with 350 ppm of hypochlorite and subsequently treated with 70 ppm of lysozyme and 350 ppm of protease followed with another 350 ppm of hypochlorite. A portion of the treated MFC broth was mixed with a given amount of xanthan gum broth and pre-hydrated CMC solution (MFC/XG/CMC=6/3/1, dry basis), then precipitated with IPA (85%), and dried and milled as in Example 1. The powdered formulation was then introduced into a STW solution and 0.25% CaCl2 solution in an amount of about 0.2% by weight thereof, respectively, and the composition was then activated with an extensional homogenizer at 1500 psi for 2 passes. The product viscosities at 6 rpm were 343 cP and 334 cP in STW and 0.25% $CaCl_2$ solutions, respectively. About 20 3.2 mm diameter nylon beads (1.14 g/mL) were dropped into each of the solutions (in STW or 0.25% $CaCl_2$ solution) and the solutions were left at room temperature for 24 hrs. None of the beads settled down to the bottom of the beakers after the 24-hour time period.

EXAMPLE 16

MFC was produced in a 1200 gal fermentor with final yield of 1.6 wt %. The broth was treated with 350 ppm of hypochlorite and subsequently treated with 70 ppm of lysozyme and 350 ppm of protease followed with another 350 ppm of hypochlorite. A portion of the treated MFC broth was mixed with a given amount of pre-hydrated pectin and CMC solutions (MFC/Pectin/CMC=6/3/1, dry basis), then precipitated with IPA (85%), and dried and milled as in Example 1. The powdered formulation was then introduced into a STW solution and 0.25% CaCl2 solution in an amount of about 0.2% by weight thereof, respectively, and the composition was then activated with an extensional homogenizer at 1500 psi for 2 passes. The product viscosities at 6 rpm were 306 cP and 293 cP in STW and 0.25% $CaCl_2$ solutions, respectively. About 20 3.2 mm diameter nylon beads (1.14 g/mL) were dropped into each of the solutions (in STW or 0.25% $CaCl_2$ solution) and the solutions were left at room temperature for 24 hours. None of the beads settled down to the bottom of the beakers after the 24-hour time period.

EXAMPLE 17

MFC was produced in a 1200 gal fermentor with final yield of 1.6 wt %. The broth was treated with 350 ppm of hypochlorite and subsequently treated with 70 ppm of lysozyme and 350 ppm of protease followed with another 350 ppm of hypochlorite. A portion of the treated MFC broth was mixed with a given amount of pre-hydrated CMC solution (MFC/CMC=3/1, dry basis), then precipitated with IPA (85%), and dried and milled as in Example 1. The powdered formulation was then introduced into a STW solution and 0.25% $CaCl_2$ solution in an amount of about 0.2% by weight thereof, respectively, and the composition was then activated with an extensional homogenizer at 1500 psi for 2 passes. The product viscosities at 6 rpm were 206 cP and 202 cP in STW and 0.25% CaCl2 solutions, respectively. About 20 3.2 mm diameter nylon beads (1.14 g/mL) were dropped into each of the solutions (in STW or 0.25% $CaCl_2$ solution) and the solutions were left at room temperature for 24 hours. None of the beads settled down to the bottom of the beakers after the 24-hour time period.

EXAMPLE 18

MFC was produced in a 1200 gal fermentor with final yield of 1.54 wt %. The broth was treated with 350 ppm of hypochlorite and subsequently treated with 70 ppm of lysozyme and 350 ppm of protease followed with another 350 ppm of hypochlorite. A portion of the treated MFC broth was mixed with a given amount of Diutan broth (MFC/Diutan=2/1, dry basis), then precipitated with IPA (85%), and dried and milled as in Example 1. The powdered formulation was then introduced into a de-ionized water solution in an amount of about 0.2% by weight thereof, with 10% CMC added simultaneously, and the composition was then activated with an extensional homogenizer at 1500 psi for 2 passes. The product viscosity at 6 rpm was 214 cP.

Each sample exhibited excellent and highly desirable viscosity modification and yield stress results. In terms of bacterial cellulose products, such results have been heretofore unattainable with bacterial cellulose materials alone and/or with the low complexity methods followed herein.

While the invention will be described and disclosed in connection with certain preferred embodiments and practices, it is in no way intended to limit the invention to those specific embodiments, rather it is intended to cover equivalent structures and all alternative embodiments and modifications as may be defined by the scope of the appended claims and equivalence thereto.

The invention claimed is:

1. A viscosity-modifying coated bacterial cellulose-containing formulation comprising at least one substantially continuous reticulated network of bacterial cellulose fibers that are at least partially coated with at least one polymeric thickener comprising at least one charged cellulose ether and at least one precipitation agent, wherein the formulation is a co-precipitate from a water-miscible non-aqueous liquid, and wherein said formulation exhibits a viscosity capability greater than 300 cps and a yield stress measurement of at least 1.0 dyne/cm$^2$ when introduced in an amount of at most 0.36% by weight of a 500 mL sample of water and after application of at most 2 passes at 1500 psi in an extensional homogenizer.

2. The formulation of claim 1 wherein said charged cellulose ether is selected from the group consisting of at least one carboxymethylcellulose, at least one cationic hydroxyethylcellulose, and any mixtures thereof.

3. The formulation of claim 1 wherein said precipitation agent is selected from the group consisting of a xanthan product, pectin, alginates, gellan gum, welan gum, rhamsan gum, carrageenan, guar gum, agar, gum arabic, gum ghatti, karaya gum, gum trafacanth, tamarind gum, locust bean gum, diutan gum, and any mixtures thereof.

4. The formulation of claim 1 wherein said bacterial cellulose product is microfibrillated cellulose.

5. The formulation of claim 3 wherein said precipitation agent is xanthan.

6. The formulation of claim 3 wherein said precipitation agent is pectin.

7. The formulation of claim 3 wherein said precipitation agent is diutan gum.

8. A method for the production of a viscosity-modifying coated bacterial cellulose-containing formulation having a viscosity capability of more than 300 cps, comprising the steps of:
   a) providing a bacterial cellulose product that includes a substantially continuous reticulated network of bacterial cellulose fibers;
   b) optionally lysing the bacterial cells from the bacterial cellulose product;
   c) mixing said bacterial cellulose product of either step "a" or step "b" with a polymeric thickener comprising at least one charged cellulose ether and at least one precipitation agent to provide a coating of said polymeric thickener on at least a portion of a surface of said bacterial cellulose product; and
   d) co-precipitating the mixture of step "c" with a water-miscible non-aqueous liquid to recover the coated bacterial cellulose product.

9. The method of claim 8 wherein said polymeric thickener of step "c" is a charged cellulose ether.

10. The method of claim 9 wherein said charged cellulose ether is selected from the group consisting of sodium carboxymethylcellulose, cationic hydroxyethylcellulose, and any mixtures thereof.

11. The method of claim 8 wherein said polymeric thickener of step "c" is a precipitation agent.

12. The method of claim 11 wherein said precipitation agent is selected from the group consisting of a xanthan product, pectin, alginates, gellan gum, welan gum, diutan gum, rhamsan gum, carrageenan, guar gum, agar, gum arabic, gum ghatti, karaya gum, gum tragacanth, tamarind gum, locus bean gum, diutan gum, and any mixtures thereof.

13. The method of claim 8 wherein said bacterial cellulose product is a microfibrillated cellulose.

14. The method of claim 13 wherein said polymeric thickener of step "c" is a charged cellulose ether.

15. The method of claim 14 wherein said charged cellulose ether is selected from the group consisting of sodium carboxymethylcellulose, cationic hydroxyethylcellulose, and any mixtures thereof.

16. The method of claim 13 wherein said polymeric thickener of step "c" is a precipitation agent.

17. The method of claim 16 wherein said precipitation agent is selected from the group consisting of a xanthan product, pectin, alginates, gellan gum, diutan gum, welan gum, rhamsan gum, carrageenan, guar gum, agar, gum arabic, gum ghatti, karaya gum, gum tragacanth, tamarind gum, locust bean gum, and any mixtures thereof.

18. The method of claim 17 wherein said precipitation agent is selected from the group consisting of xanthan, pectin, diutan gum, and any mixtures thereof.

19. A method for the production of a viscosity-modifying coated bacterial cellulose-containing formulation having a viscosity capability of more than 300 cps comprising the steps of
   a) providing a bacterial cellulose product comprising a substantially continuous reticulated network of bacterial cellulose fibers;
   b) optionally lysing the bacterial cells from the bacterial cellulose product;
   c) mixing said resulting bacterial cellulose product of either step "a" or step "b" with at least one precipitation agent selected from the group consisting of a xanthan product, pectin, alginates, gellan gum, welan gum, diutan gum, rhamsan gum, carrageenan, guar gum, agar, gum arabic, gum ghatti, karaya gum, gum tragacanth, tamarind gum, locust bean gum, and any mixtures thereof to provide a coating of said precipitation agent on at least a portion of a surface of said bacterial cellulose product; and
   d) co-precipitating the mixture of step "c" with a water-miscible non-aqeous liquid to recover the coated bacterial cellulose product.

20. The method of claim 19 wherein said precipitation agent is selected from the group consisting of xanthan, pectin, diutan gum, and any mixtures thereof.

21. A method for the production of a bacterial cellulose-containing formulation having a viscosity capability of more than 300 cps comprising the steps of
   a) providing a bacterial cellulose product comprising a substantially continuous reticulated network of bacterial cellulose fibers;
   b) mixing said bacterial cellulose product with at least one precipitation agent selected from the group consisting of a xanthan product, pectin, alginates, gallan gum, welan gum, diutan gum, rhamsan gum, carrageenan, guar gum, agar, gum arabic, gum ghatti, karaya gum, gum tragacanth, tamarind gum, locust bean gum, and any mixtures thereof to provide a coating of said precipitation agent on at least a portion of a surface of said bacterial cellulose product;

c) co-lysing the mixture of step "b" to remove bacterial cells therefrom; and d) co-precipitating the mixture of step "c" with a water-miscible non-aqueous liquid to recover the coated bacterial cellulose product.

22. The method of claim 21 wherein said precipitation agent is selected from the group consisting of xanthan, pectin, diutan gum, and any mixtures thereof.

* * * * *

UNITED STATES PATENT AND TRADEMARK OFFICE
CERTIFICATE OF CORRECTION

PATENT NO.         : 8,053,216 B2                                Page 1 of 1
APPLICATION NO.    : 11/135077
DATED              : November 8, 2011
INVENTOR(S)        : Zhi-Fa Yang et al.

It is certified that error appears in the above-identified patent and that said Letters Patent is hereby corrected as shown below:

At column 14, line 60, after "a" insert --viscosity-modifying coated--.

Signed and Sealed this
Third Day of January, 2012

David J. Kappos
*Director of the United States Patent and Trademark Office*